United States Patent [19]
Pruitt

[11] Patent Number: 5,566,535
[45] Date of Patent: Oct. 22, 1996

[54] REMOTE HEADER ANGLE ADJUSTMENT MECHANISM FOR SWING-TONGUE HARVESTERS

[75] Inventor: Martin E. Pruitt, Hesston, Kans.

[73] Assignee: Hay & Forage Industries, Hesston, Kans.

[21] Appl. No.: 438,245

[22] Filed: May 9, 1995

[51] Int. Cl.⁶ .................................................. A01D 47/00
[52] U.S. Cl. .................. 56/15.1; 56/10.2 E; 56/15.8; 56/15.9; 56/DIG. 14
[58] Field of Search ................................... 56/15.1, 15.2, 56/6, 15.4, 15.5, 15.8, 15.9, 10.2 E, DIG. 9, DIG. 14

[56]  References Cited

U.S. PATENT DOCUMENTS

| | | | |
|---|---|---|---|
| 4,147,016 | 4/1979 | Jensen et al. | 56/15.8 |
| 5,060,462 | 10/1991 | Helfer et al. | 56/15.8 X |
| 5,272,859 | 12/1993 | Pruitt et al. | 56/15.2 |
| 5,337,544 | 8/1994 | Lauritsen | 56/DIG. 14 X |
| 5,471,825 | 12/1995 | Panoushek et al. | 56/10.2 E |

OTHER PUBLICATIONS

Ford New Holland, Inc. 1993 Operator's Manual (Issue Feb. 1993); Form No. 0(415)-2M-293P); Discbine® Mower--Conditioner 415; front and back coversheets, pp. 14-15, 27, 42 and 60.

*Primary Examiner*—Terry Lee Melius
*Attorney, Agent, or Firm*—Hovey, Williams, Timmons & Collins

[57] ABSTRACT

A pull-type harvesting machine is provided having a hydraulically controlled header tilt adjustment mechanism that can be operated from the tractor seat of a towing vehicle. The tilt adjustment mechanism includes a hydraulic tilt circuit and a remotely operated control valve assembly connectable with the tilt circuit and another operating circuit of the harvester. The valve assembly is shiftable between a pair of alternative positions for communicating either the operating circuit or the tilt circuit with the towing vehicle's source of hydraulic pressure. Accordingly, a single source of pressurized fluid may be controlled from within the towing vehicle to alternatively operate either the header tilt mechanism or another function of the harvester, such as swinging of a pulling tongue from side-to-side for lateral positioning of the machine relative to a towing vehicle.

41 Claims, 3 Drawing Sheets

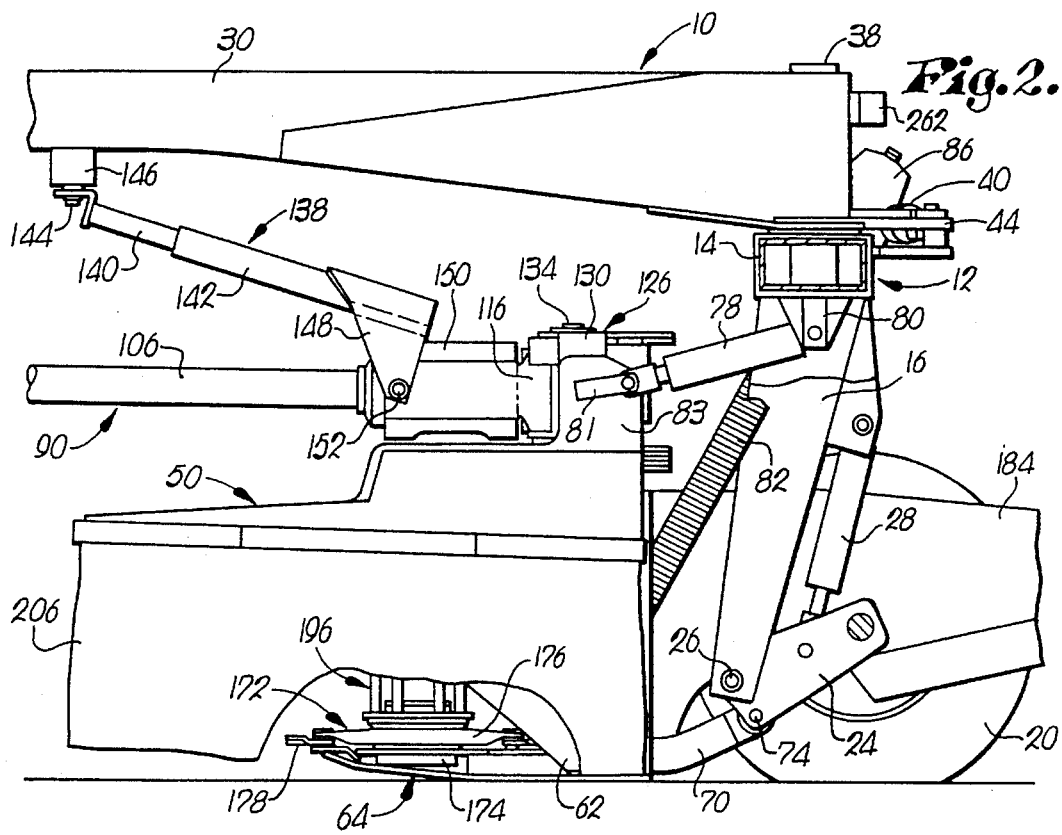
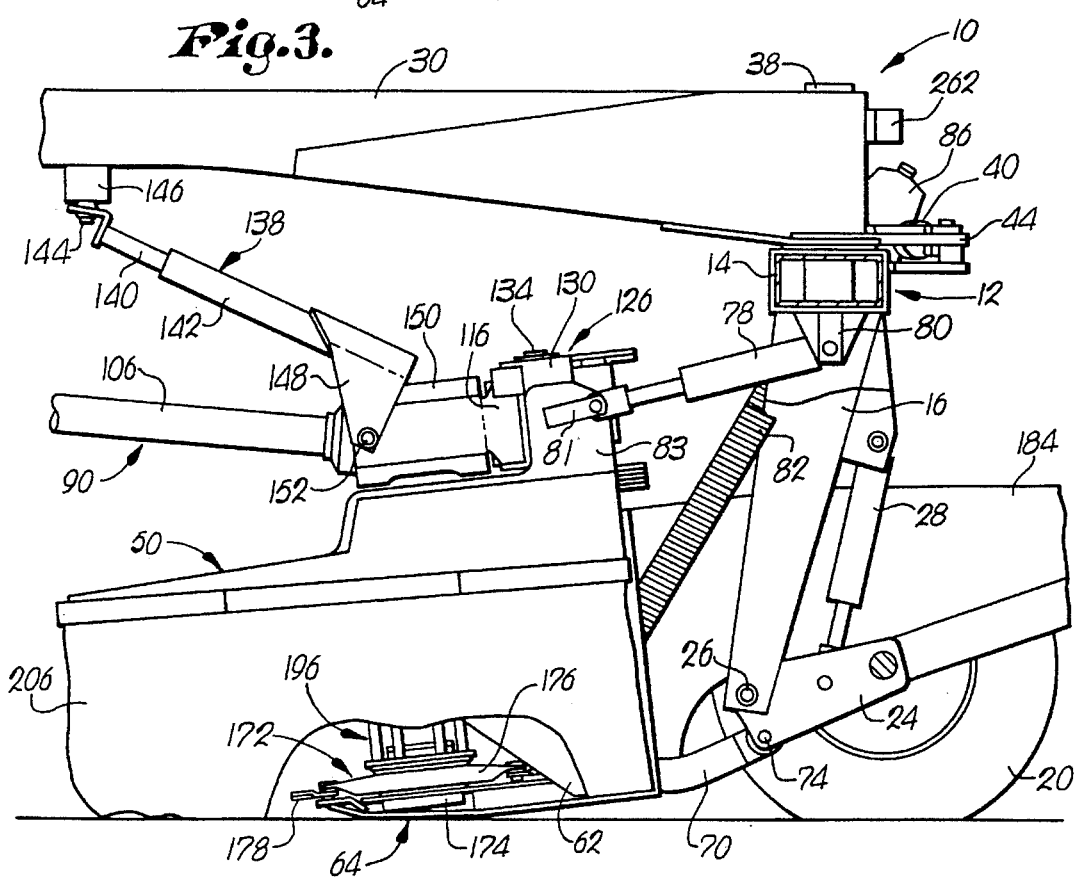

5,566,535

REMOTE HEADER ANGLE ADJUSTMENT MECHANISM FOR SWING-TONGUE HARVESTERS

BACKGROUND OF THE INVENTION

1. Field of the Invention

The present invention relates generally to crop harvesting equipment and, more particularly, to pull-type mowers or mower/conditioners in which the front of the header can be adjustably tilted up or down to change the angle of attack of the cutter mechanism on the header.

2. Discussion of Prior Art

It is known to provide harvesting machines having a harvesting header which may be adjustably tilted between a number of harvesting positions. Specifically, mower/conditioners are often provided with a harvesting header having a cutter bed transverse to the path of travel of the machine; the header being adjustable to vary the mowing angle relative to the ground (this is commonly referred to as the "guard angle").

An example of a mower/conditioner having an adjustable harvesting header is disclosed in U.S. Pat. No. 5,272,859 titled MECHANICAL DRIVE CENTER PIVOT MOWER CONDITIONER, which is owned by the assignee of the present invention. The harvesting machine disclosed in the '859 Patent is a pull-type harvester which requires the use of a separate tractor for towing the harvester through the field during use. Further, the '859 harvesting machine utilizes a header which may be adjusted to various guard angles.

The guard angle in that machine is adjusted in response to harvesting conditions. For example, in ideal conditions (i.e., dry climate and free standing crop) the guard angle is preferably set at approximately three degrees. In down crop conditions (wet or matted crop) the guard angle is preferably set at around six degrees. In rocky conditions or in portions of the field having numerous obstructions, such as dirt clods, the guard angle is set at zero degrees (i.e., substantially parallel to the ground). Finally, the guard angle may also be adjusted by the operator to vary the cut crop stubble height.

Contrary to most self-propelled harvesters, the harvesting header of the '859 harvester must be manually adjusted to vary the guard angle. Such adjustment requires the machine operator to stop harvesting operations, disconnect all power to the harvester (mechanical and hydraulic), exit the towing vehicle, adjust the header as necessary and finally resume crop harvesting. Obviously, such a process is bothersome and time-consuming.

Therefore, it would be desirable to have a harvesting machine that provides remote header tilt adjustment, preferably controlled from within the cab of the towing vehicle (i.e., at the tractor seat). Traditional towing vehicles are provided with power sources, such as a power takeoff shaft and pressurized hydraulic fluid, that are controlled from within the tractor seat. Operating components of a harvester may be remotely controlled (from the tractor seat) by coupling these components with one of the towing vehicle power sources. Thus, it would be desirable to remotely control header tilt adjustment by utilizing one of the existing power sources of the towing vehicle.

However, the solution for remotely controlling header tilt is not so simple. Although towing vehicles are furnished with power sources for driving harvester components, the number of these sources is limited. Most often, towing vehicles have a single mechanical power takeoff shaft and two sources of pressurized hydraulic fluid. Unfortunately, this configuration limits the number of harvesting functions which may be controlled from within the vehicle cab.

If a conventional pull-type harvester is already utilizing both of the towing vehicle power sources for functions other than header tilt adjustment (e.g., for mowing the crop, frame elevation and swinging of a pulling tongue), the header tilt may not be remotely controlled and powered by the towing vehicle; unless, of course, the operator manually disconnects a power source from one of the other harvesting functions and reconnects it to the mechanism for adjusting header tilt. In this situation, the machine operator is left with two equally poor options; 1) replace an existing harvesting function with header tilt adjustment, which may eliminate a function essential to harvesting operations; or 2) expend the time necessary to manually switch a power source from one component to another. Thus, it would be further desirable to have a pull-type harvester that uses one of the towing vehicle's power sources for header tilt adjustment, without having to wholly eliminate a harvesting function or manually disconnect and reconnect the harvester's components to the power sources.

OBJECTS AND SUMMARY OF THE INVENTION

Accordingly, an important object of the present invention is to provide a pull-type harvesting machine in which pressurized flow from one of the towing vehicle's hydraulic fluid sources is alternatively shifted to either the header tilt adjustment mechanism or another component of the harvester. Thus, the source of pressurized fluid is not used to control just one function of the harvester, but is shifted from the tractor seat to control either the tilt mechanism or another component.

Another object of the present invention is to provide a pull-type harvester in which an operator may adjust the header to various guard angles from the tractor seat by controlling one of two available sources of pressurized hydraulic fluid.

In accordance with these and other objects evident from the following description of a preferred embodiment of the invention, the remote header tilt adjustment mechanism includes a hydraulic tilt circuit and a remotely operable control valve assembly connectable with the tilt circuit and another operating circuit of the harvester. The valve assembly is shiftable between a pair of alternative positions for communicating either the operating circuit or the tilt circuit with a towing vehicle's source of hydraulic pressure. Further, the invention includes actuating mechanism operably connectable with the valve assembly for selectively and remotely controlling the shifting of the valve assembly between its alternative positions.

It will be appreciated that the present invention may also be used as an attachment to retrofit a pull-type harvesting machine for remote header tilt adjustment, wherein a towing vehicle's source of pressurized hydraulic fluid is used to alternatively control either the tilt mechanism or another component of the harvester.

BRIEF DESCRIPTION OF THE DRAWING FIGURES

A preferred embodiment of the invention is described in detail below with reference to the attached drawing figures, wherein:

FIG. 2 is an enlarged, fragmentary, side elevational view of the harvester depicted in FIG. 1, with parts broken away to illustrate the harvesting header and mechanism for remotely tilting the header;

FIG. 3 is an enlarged, fragmentary, side elevational view similar to FIG. 2, but illustrating the header in a tilted position, i.e. at a guard angle greater than zero;

Figure 5:
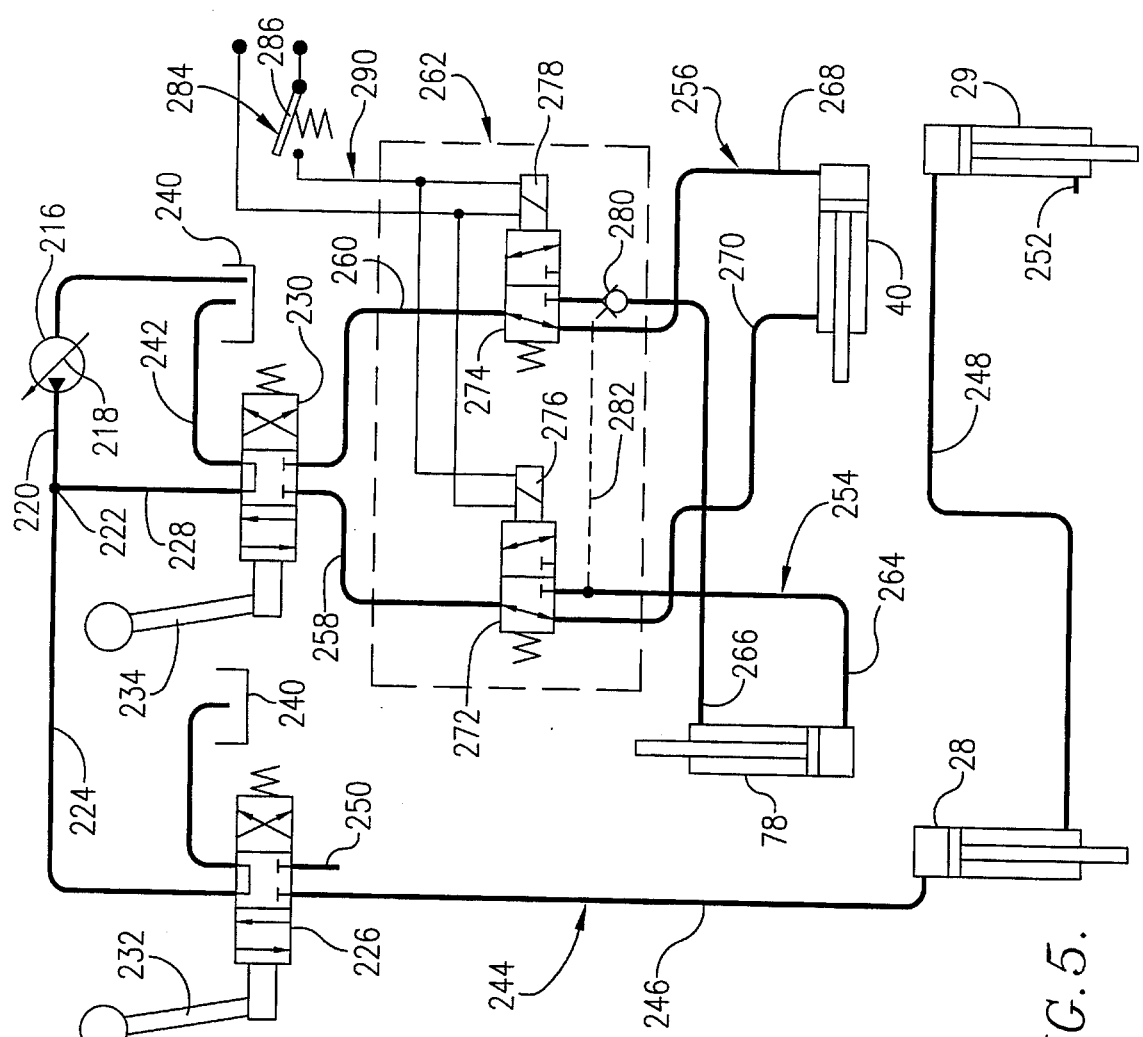
Figure 4:
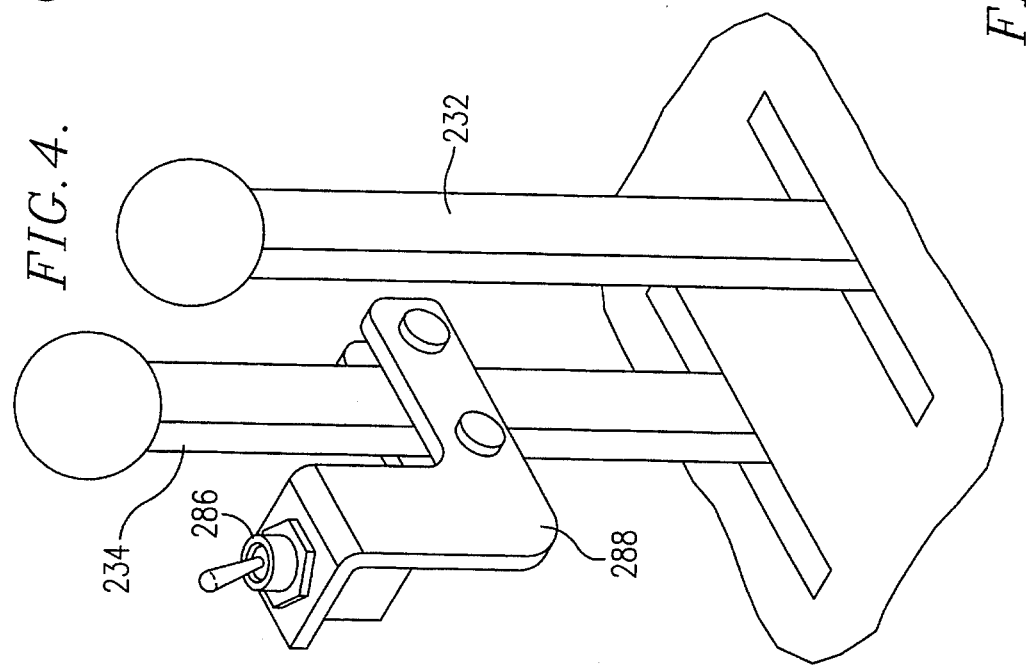

FIG. 4 is an enlarged perspective view of a towing vehicle's hydraulic control levers used to control flow of pressurized hydraulic fluid to and from the vehicle, one of the levers being provided with a switch for controlling the header tilt adjustment mechanism; and FIG. 5 is a schematic diagram of the hydraulic circuit for the preferred embodiment of the tilt mechanism, including a control valve assembly and an actuating mechanism.

DETAILED DESCRIPTION OF THE PREFERRED EMBODIMENT

Figure 1:
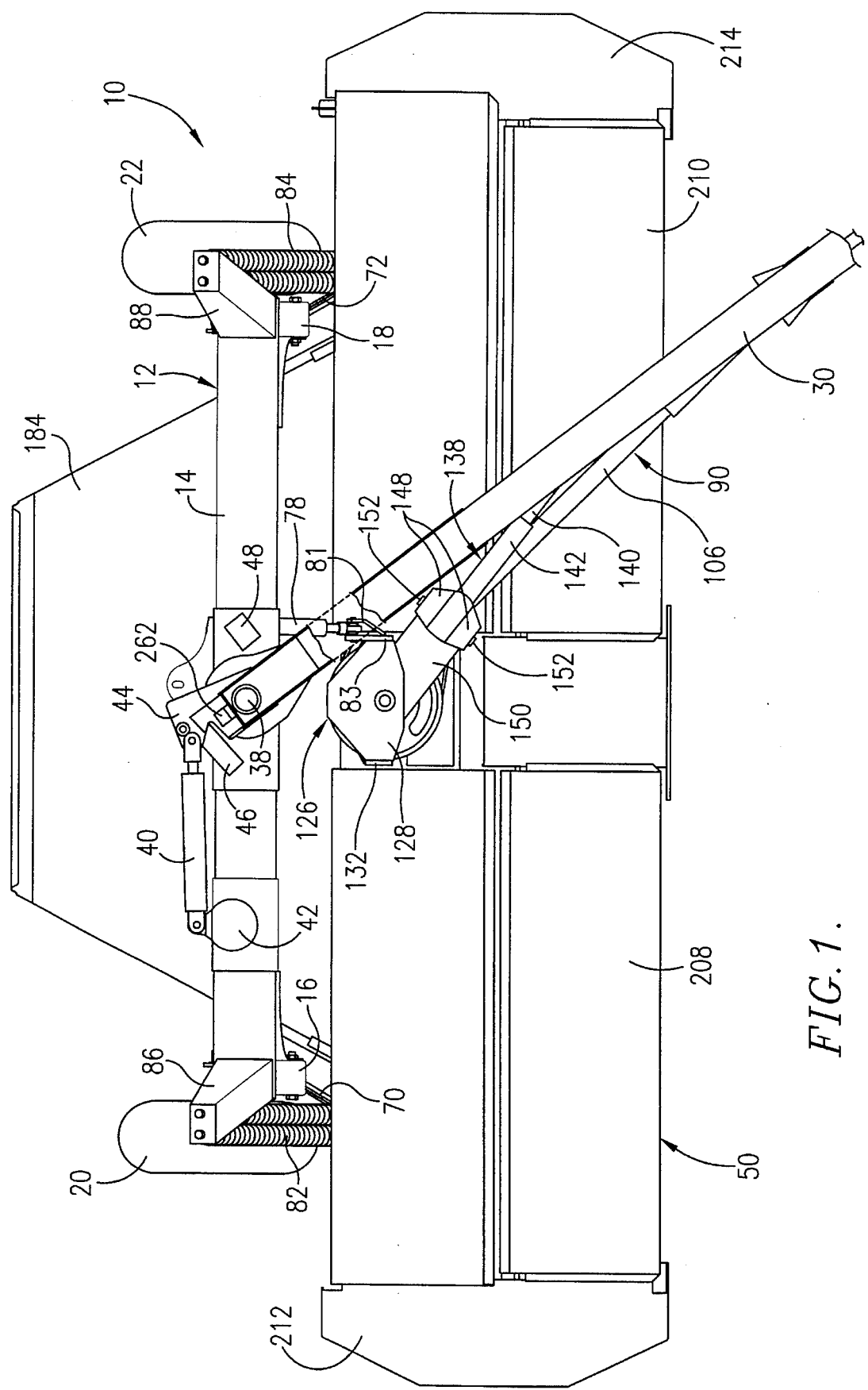
FIG. 1 is a top plan view of a pull-type harvester having a remotely controlled header tilt adjustment mechanism constructed in accordance with principles of the present invention.

Turning now to the drawings, and particularly FIGS. 1–3, the preferred embodiment contemplates a harvesting machine, generally designated 10, that includes an inverted, generally U-shaped mobile frame 12. The frame has an upper cross beam 14 and a pair of depending legs 16 and 18 at opposite ends of the beam. A pair of ground wheels 20 and 22 are connected to the lower ends of the legs 16, 18 respectively, via respective fore-and-aft wheel arms 24, only one of such arms 24 being visible in the drawings (see FIGS. 2 and 3). Each of the wheel arms 24 has a transverse, pivot connection 26 at its forward end with the lower end of the respective leg 16 or 18, and each wheel arm 24 is swung about such pivot connection 26 by its respective hydraulic cylinder 28, 29 (only cylinder 28 is depicted in FIGS. 2 and 3) so that the frame 12 is effectively raised and lowered by extending and retracting the cylinders 28, 29, respectively.

The frame 12 is adapted for towing movement through a long fore-and-aft tongue 30 having a hitch (not shown) at its front end for pivotal connection to a towing tractor (also not shown). At its rear end, the tongue 30 is journaled on a vertical pivot post 38 which is fixed to the cross beam 14 of the frame 12 substantially centrally between its two opposite ends. The pivot post 38 thus defines a first upright pivot axis. Although the tongue 30 is shown in FIG. 1 in its position of leftmost swinging movement, it is to be understood that it can be swung about the pivot 38 to an infinite number of angular positions with respect to the path of travel of the harvester 10, including a centered position and a full rightmost position which is not illustrated but is the mirror image of the leftmost position in FIG. 1. In order to effect such swinging of the tongue 30 from the driver's seat of the tractor, the harvester 10 is provided with a hydraulic swing cylinder 40 which lies along the backside of the cross beam 14 and is connected between a mounting lug 42 on the cross beam 14 (FIG. 1) and a short crank 44 projecting rigidly rearwardly from the tongue 30 behind the pivot 38. A pair of stops 46 and 48 on the cross beam 14 are located on opposite lateral sides of the pivot 38 in position to abuttingly engage the crank 44 so as to define mechanical limits of swinging motion of the tongue 30.

Supported by the frame 12 beneath the swing tongue 30 is a harvesting header broadly denoted by the numeral 50. In accordance with the principles of the present invention, the header 50 may be constructed in a number of different ways to perform a number of different functions. In the illustrated embodiment, the header 50 is designed to only mow or cut the standing crop. It will be understood, however, that the principles of the present invention are not limited to a machine which merely mows the crop. For example, it is well within the scope of the present invention to provide a header that also conditions the crop before returning the cut crop to the ground in a windrowed or swathed condition.

The header 50 has a frame of its own which can be described as being of generally open, box-like construction in a rectangular configuration. The header frame and additional header support structure may take a variety of configurations as well understood by those skilled in the art and form no part of the present invention, per se. It will be appreciated, however, that the header support structure includes a pair of upright, left and right bulkheads that are located at opposite ends of the frame. A portion of the right bulkhead 62 is illustrated in FIGS. 2 and 3. The lower ends of the bulkheads are interconnected by a forwardly offset, transverse cutter bed broadly denoted by the numeral 64, which serves to mow or cut the crop as the machine is pulled across a field.

The header 50 is supported for up and down swinging movement beneath the tongue 30 by a pair of lower support links 70 and 72 (FIGS. 1, 2, and 3), each of which is pivotally connected at its rear end to a cranked connection point 74 on the corresponding wheel arm 24 and at its front end via a pivotal connection (not shown) to the header 50. A centrally disposed header tilt cylinder 78 pivotally connects the upper rear portion of the header 50 with the frame 12 so that the header 50 is supported in a three-point arrangement. As will subsequently be described, the cylinder 78 also effects the tilting of the header 50 to the various guard angles. Preferably, the cylinder 78 is pivotally connected between a depending lug 80 on the underside of the cross beam 14 and a small fixed lug 81 that is secured to an upright extension of the header support structure 83. Long flotation springs 82 and 84 at opposite ends of the header 50 connect the bulkheads with corresponding, upwardly and outwardly angled posts 86 and 88 at opposite ends of the cross beam 14. In this manner, the header 50 is floatingly supported for up and down movement relative to the frame 12 beneath the tongue 30 as rises and falls are encountered in the terrain during advancement of the harvester. The links 70, 72 and pivotally connected cylinder 78 swing up and down with the header 50 during such movement. For over-the-road travel, the frame elevation cylinders 28 are extended, whereby the wheel arms 24 are caused to swing downwardly and forwardly in counterclockwise directions about the pivots 26, pushing the header 50 forwardly and upwardly with the assistance of the flotation springs 82 and 84.

The cylinder 78 is also utilized to tilt the header to desired guard angles. As is apparent by comparing FIGS. 2 and 3, extension of cylinder 78 causes the guard angle to increase, whereas retraction of cylinder 78 decreases the guard angle. It will be noted that since the cylinder 78 is pivotally connected at both ends, extension or retraction of cylinder 78 merely effects the guard angle and not the up and down swinging movement of the header 50. In other words, upon adjusting the guard angle by extending or retracting the cylinder 78, the header 50 is not restricted from swinging up and down relative to the frame 12, as was previously described.

A mechanical driveline broadly denoted by the numeral 90 extends along and is rotatably supported by the tongue 30 for delivering driving power from the towing tractor to the operating components of the harvester 10. At one end of the driveline 90, structure is provided to connect the driveline 90 to the power takeoff shaft of a tractor (not shown). This structure is well understood by those skilled in the art and forms no part of the present invention, per se. At the opposite end of the driveline 90, a long telescoping section 106 of the driveline 90 is preferably housed within a protective, telescoping shield well understood by those skilled in the art and commonly commercially available in the agricultural machinery industry. The telescoping section 106 is connected to the input shaft (not shown) of a standard right angle gearbox 116.

The gearbox 116 is not mounted on the tongue 30, but is instead supported by the header 50 in direct frontal alignment with the tongue pivot 38. Although not illustrated in the drawings, it will be understood that within the gearbox 116, a pair of suitable bevel gears are provided to provide a right angle driving connection between the input shaft and an upright, downwardly extending output shaft (not shown). The output shaft of the gearbox has a sheave unit 120 fixed thereto, the sheave unit supplying driving power for the operating components on the header 50.

It will be appreciated that the gearbox 116 is not supported by either the input shaft or output shaft, but is rotatably carried by a cradle broadly denoted by the numeral 126. The cradle 126 has an open, generally rectangular, rigid, frame loop 128 that has two stiff, upright side brackets 130 (FIGS. 2 and 3) and 132 (FIG. 1) that support the loop 128 on edge and are rigidly fixed at their lower ends to the header frame (connection not shown). While the loop 128 is fixed and stationary relative to the header frame, the gearbox 116 is not, and instead can swivel about an upright axis coinciding with the axis of rotation of the output shaft. Such swivelling axis is defined for the gearbox 116 by an upper trunnion 134 in the horizontal top portion of the frame loop 128 and by a coaxial, lower trunnion (not shown) in the lower horizontal part of the frame loop 128. The axis defined by the trunnions thus presents a second, upright pivot axis on the harvester 10, such second axis being located in direct fore-and-aft alignment with the tongue pivot axis 38 and spaced forwardly therefrom.

It is desirable to pivot the gearbox 116 about its pivot axis 134 in response to swinging of the pull-tongue 30 so as to keep the input shaft of the gearbox 116 at least generally aligned with the telescoping section 106 of the driveline 90. For this purpose, the gearbox 116 is provided with steering structure 138 that interconnects the tongue 30 and the gearbox 116 so as to transmit swinging motion of the tongue 30 to the gearbox 116. As shown particularly in FIGS. 2 and 3, the steering structure 138 comprises a tubular, telescopic linkage consisting of an inner section 140 and a concentrically disposed outer section 142. The inner tube 140 has at its forward end a ball and socket swivel connection 144 with a bracket 146 on the underside of the tongue 30. The opposite end of the inner tube 140 is slidingly received within the outer tube 142, which has a pair of laterally spaced apart, downwardly projecting ears 148 that straddle a rigid, tubular housing 150 projecting forwardly from the gearbox 116. The housing 150 protectively encircles the connection between the telescoping section 106 and the input shaft of the gearbox 116. The lowermost ends of the two ears 148 are provided with aligned, horizontal pivots 152 that connect the ears 148 with the front end of the housing 150.

Returning now to the cutter bed 64, the bed 64 is provided with a series of cutter units 172 (the right endmost cutting unit being depicted in FIGS. 2 and 3). Each of the cutter units 172 includes a generally oval shaped, generally flat, formed metal carrier 176 that has a pair of swingable knives 178 at its opposite longitudinal ends. The knives 178 are pivotally secured to the carrier 176 in the usual manner and project out radially during rotation of the carrier 176.

Although not illustrated, it will be appreciated that the cutter unit 172 has a vertical shaft that is drivingly connected to a flat, horizontal gear case 174 that extends across the lower front margin of the header 50 and generally forms the lower transverse extremity of the cutter bed 64. Within the gear case 174, a line of intermeshing gears may be provided corresponding in number and position to the number of cutter units 172 disposed in the series across the front of the header and forming part of the cutter bed 64. As an alternative to the intermeshing gears, belts and pulleys or driveshafts with bevel gears may be utilized, although in the preferred embodiment flat, intermeshing spur gears are selected. Details of construction of the gear case 174 and the cutter units 172 are not set forth herein in view of the fact that those skilled in the art are well acquainted with constructional details of cutter beds of the type exemplified by the cutter bed 64.

Preferably, the cutter units 172 are spaced along the gear case 174 at such distances that the circular paths of travel described by adjacent carriers in the series overlap one another. Moreover, the adjacent carriers 176 are oriented 90° out of phase to one another so that as the longitudinal axis of one carrier is extending fore-and-aft, the longitudinal axis of the next adjacent carrier is extending side-to-side, and vice versa. The intermeshing gears within the gear case 174 beneath the carriers 176 maintain the cutter units 172 in proper timed relationship with one another.

Further, it is preferred that adjacent cutter units 172 in the series rotate in opposite directions relative to one another about their respective upright axes. Thus, successive pairs of the cutter units 172 along the bed 64 cooperate to sever the standing crop engaged by the leading edge of the bed 64 and transfer it rearwardly over the top of the bed 64 to deflector shields 184, as shown in FIGS. 1, 2 and 3, which deflect the crop and direct it downwardly onto the ground. If desired, a pair of conditioner rollers (not shown) may be operably disposed between the cutter bed 64 and deflector shield 184 for further processing the cut crop before it is discharged from the harvester.

If desired, a number of protective, rubberized curtains 206 (FIGS. 2 and 3) may be provided about the front and side margins of the header 50. Such curtains 206 hang from a pair of front panels 208 and 210 across the front of the header 50 which are hinged along their rear extremities to permit the panels 208, 210 to swing up to access positions. Other curtains along the side margin of the header 50 are supported at the outer extremities of opposite panels 212 and 214, which, likewise, are hinged along their inner margins to permit swinging up into access positions and for narrower roading width. These curtains protect the operator and surrounding items, such as the tractor, from objects thrown from the cutter bed. The curtains also reduce the likelihood of cut crop being carried out the side or front of the header by the cutters.

FIG. 5 shows the preferred hydraulic control circuit of the present invention. Conventionally, towing vehicles or tractors are provided with an onboard pump 216 that is mechanically driven by the tractor engine (not shown). A swash plate 218 of the pump may be adjustably stroked or destroked to change its angular position so as to correspondingly adjust the output flow rate of fluid therefrom as measured, for example, in gallons per minute.

A high pressure line 220 leads from the pump 216 to a tee connection 222, where one branch line 224 leads to a header lift three-position valve 226. The other branch line 228 supplies pressurized fluid to a swing-and-tilt three-position valve 230. The valves 226, 230 are manually shifted to a desired position by onboard levers 232, 234, respectively. The levers 232, 234 are conveniently located in the proximity of the tractor seat so that the operator can manually operate the valves 226, 230 from the seat.

A low pressure return line 238 leads from the header lift valve 226 to a reservoir 240, also located on the towing vehicle. Likewise, a return line 242 leads from the header swing-and-tilt valve 230 to the reservoir 240. Further, both valves 226, 230 are preferably spring biased into a neutral or fluid blocking position (as shown in FIG. 5) so that pressurized fluid is prevented from flowing through the valves absent manual shifting of the valves.

The header lift circuit, generally denoted 244, includes a supply line 246 that communicates the lift valve 226 to the piston side of cylinder 28. Although the supply line 246 is illustrated as continuous, it will be appreciated that line 246 is spliced by a connection that releasably connects a supply line from the tractor to a receiving line on the harvester 10 so that the harvester may be disconnected from the tractor. The lift cylinders 28, 29 are connected in series by a connecting line 248. The series connection of cylinders 28, 29 provides simultaneous and equal extension and retraction of the cylinders so that the frame 12 remains level as the height of the harvester 10 is adjustably varied.

It will be noted that the preferred header circuit 244 does not have a line connecting the rod side of cylinder 29 to the lift valve 226, but includes a plugged line 250 and open line 252. Necessarily, cylinders 28, 29 are single acting, i.e. the pressurized fluid is used only to extend the cylinders.

Accordingly, when the operator desires to raise the harvester frame 12, for example, for over-the-road travel, the lever 232 is operated to shift the lift valve 226 to its rightmost position. With the lift valve 226 in its rightmost position, pressurized fluid is allowed to flow through supply line 246 and into the piston side of cylinder 28. Consequently, cylinder 28 and 29 are simultaneously and equally extended. If the operator desires to lower the harvester frame 12, the valve 226 is shifted to its leftmost position. Thereupon, fluid from supply line 246 is allowed to flow freely through low pressure return line 238 and into the reservoir 240, which allows the weight of the harvesting machine 10 to retract the cylinders 28, 29.

The swing-and-tilt valve 230 is utilized to control a header tilt circuit, broadly referenced by numeral 254, and a tongue swing circuit, generally denoted 256. A first line 258 and second line 260 are used to connect the swing-and-tilt valve 230 to a harvester mounted, control valve assembly 262 (FIGS. 1–3 and illustrated for purposes of clarity as dashed lines in FIG. 5); the valve assembly 262 being disposed between the swing-and-tilt valve 230 and the circuits 254, 256.

The header tilt circuit 254 preferably includes the cylinder 78, a high pressure piston line 264 connected to the piston side of the cylinder 78, and a high pressure rod line 266 connected to the rod side of the cylinder 78. Similarly, the tongue swing circuit 266 includes the cylinder 40, a high pressure piston line 268 connected to the piston side of the cylinder 40, and a high pressure rod line 270 connected to the rod side of the cylinder 40.

The control valve assembly 262 includes a pair of two-position valves 272, 274, each of which are shifted by an associated solenoid 276, 278. As shown in FIG. 5, assembly valve 272 is preferably connected with line 258, piston line 264, and rod line 270 so that valve 272 may control flow of pressurized fluid to and from the header tilt circuit 254 and tongue swing circuit 256. Similarly, valve 274 is connected with line 260, rod line 266, and piston line 268. In the preferred arrangement, the valves 272, 274 are spring biased into a rightmost position (as depicted in FIG. 5), which communicates lines 258, 260 leading from the tractor source of pressurized fluid to the tongue swing circuit 256. As will be discussed below, the solenoids 276, 278 are actuated so that the assembly valves 272, 274 are simultaneously shifted to a leftmost position, which communicates lines 258, 260 with the header tilt circuit 254.

The valve assembly 262 further includes a pilot operated check valve 280 disposed within rod line 266 and an associated pilot line 282. The pilot line 282 interconnects piston line 264 with the check valve 280 so that upon flow of pressurized fluid through line 264, the check valve 280 is unseated and fluid is allowed to flow through rod line 266. The purpose for the pilot operated check valve 280 will subsequently be described.

One suitable control valve assembly, including the assembly valves 272, 274, solenoids 276, 278, pilot operated check valve 280, and pilot line 282, is available from Delta Power Hydraulic Co. of Rockford Ill. as part No. 85006432.

Preferably, the valve assembly 262 is remotely operated by actuating mechanism, generally denoted 284. The mechanism 284 includes a spring biased, manually operated electric switch 286, which is preferably mounted on lever 234 by a mounting bracket 288 (see FIG. 4). The mechanism 284 includes an electric circuit, broadly denoted by numeral 290, that electrically couples the solenoids to the electrical power source of the tractor (not shown). The circuit 290 is configured so that upon manual operation of the switch 286, the circuit 290 is closed and the solenoids 276, 278 are simultaneously actuated to shift the assembly valves 272, 274 to the leftmost position. Note, the spring bias of switch 286 yieldably maintains the switch in a de-energizing position, which ensures that the solenoids 276, 278 are actuated only while the switch 286 is manually pushed. Thus, the assembly valves 272, 274 are shifted to and maintained in the leftmost position only while the switch 286 is manually pushed to an energizing position.

OPERATION

Accordingly, the preferred harvesting machine 10 is attached to a tractor and coupled with the tractor's power sources so that driving power is adjustably supplied to the various harvesting components of the machine. As the harvester 10 is pulled across the field, the cutter bed 64 is driven by the power takeoff of the tractor to mow the crop. As the cut crop is thrown rearwardly by the cutter bed 64, the discharge shields 184 direct the cut crop into a windrowed or swathed condition. Further, the harvester 10 may be raised or lowered for over-the-road travel or to avoid large obstructions in the field, as previously described.

More particularly, in the preferred machine 10, swinging of the pulling tongue 30 and tilting of the header 50 is controlled from the tractor seat. With the assembly valves 272, 274 in the rightmost position (i.e., with the switch 286 in the de-energizing position), the swing-and-tilt valve 230 controls the tongue swing circuit 256. If the operator wishes to swing the tongue 30 leftwardly, the lever 234 is operated to shift the swing-and-tilt valve 230 to its rightmost position. With the swing-and-tilt valve 230 it its rightmost position, pressurized fluid is allowed to flow through line 258, assembly valve 272, line 270 and ultimately into the rod side of cylinder 40. Consequently, cylinder 40 is retracted, and fluid is caused to flow from the piston side of cylinder 40, through line 268, assembly valve 274, line 260, swing-and-tilt valve 230, return line 242 and ultimately into the reservoir 240. If the operator desires to swing the tongue 30 rightwardly, the lever 234 is operated to shift the swing-and-tilt valve 230 to its leftmost position. As is apparent, in the leftmost position the flow of hydraulic fluid is reversed and cylinder 40 is extended.

When the operator wishes to control the header tilt circuit 254, the switch 286 is pushed to the energizing position, which actuates the solenoids 276, 278 to shift the assembly valves 272, 274 to the leftmost position. Accordingly, while the switch 286 is pushed, the operator may tilt the header 50 in a counterclockwise, downward direction (i.e., increase the guard angle) by operating lever 234 to shift the swing-and-tilt valve 230 to its rightmost position. With the switch 286 pushed and the swing-and-tilt valve 230 in its rightmost position, pressurized fluid flows through line 258, assembly valve 272, line 264 and into the piston side of cylinder 78. Further, fluid flows through pilot line 282 causing the check valve 280 to unseat. Consequently, cylinder 78 is extended, and fluid is caused to flow from the rod side of cylinder 78, through line 266, check valve 280, assembly valve 274, line 260, swing-and-tilt valve 230, return line 242 and into reservoir 240. When the operator wishes to tilt the header in a clockwise, upward direction (i.e., decrease the guard angle) the switch 286 is pushed and the lever 234 is operated to shift the swing-and-tilt valve 230 to its leftmost position. As is apparent, with the valve 230 in the leftmost position the flow of pressurized fluid is reversed and the cylinder 78 is retracted.

It should be apparent from the foregoing description of the hydraulic circuit that the pilot operated check valve 280 will prevent inadvertent changes in the guard angle during harvesting operations. Once the operator tilts the header 50 to the desired guard angle, the swing-and-tilt valve 230 is moved to its central position and flow of pressurized fluid in line 264 is eventually stopped. Consequently, the pressure in pilot line 282 decreases, which allows the check valve 280 to seat. The seated check valve 280 blocks flow through line 266, and thus, prevents extension of the cylinder 78.

The present invention may also be utilized as an attachment to retrofit conventional harvesters for remote header tilt adjustment. Conventional harvesters typically utilize both of the tractor's sources of pressurized fluid. As suggested, the harvester may hydraulically control the raising and lowering of the machine and the swinging of a pulling tongue to laterally move the machine relative to the tractor. Such a harvester may be represented by portions of the circuit in FIG. 5. For example, the conventional harvester would include the header lift circuit 244 and tongue swing circuit 256, but with lines 268, 270 being directly connected to the swing-and-tilt valve 230. Accordingly, the preferred attachment for retrofitting a conventional harvester for remote header tilt adjustment would include lines 258, 260, 266, 264, hydraulic cylinder 78, lugs 80, 81, assembly valves 272, 274, solenoids 276, 278, switch 286, mounting bracket 288, and electric circuit 290.

Although the foregoing description focused on a tractor having two sources of hydraulic pressure and a harvester 10 utilizing these sources to control three functions of the harvester 10, the principles of the present invention are not limited to such a configuration. Indeed, the present invention may be utilized with towing tractors with one, three, or more sources of hydraulic pressure. The present invention serves to adapt one of the hydraulic sources to alternatively control two different functions of the harvesting machine; one of those functions being header tilt. In other words, the invention allows a given number of pressurized fluid sources to control an equal number of functions of the harvester plus the header tilt adjustment mechanism; effectively creating an additional source of hydraulic pressure for header tilt adjustment.

Thus, the preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. In a pull-type crop harvesting machine, the improvement comprising:

a mobile frame;

a harvesting header attached to the frame in a manner permitting the header to be adjustably tilted between a number of harvesting tilt positions relative to the frame;

a hydraulic operating circuit for use in controlling a certain function of the machine;

a hydraulic tilt circuit for controlling tilt of the header;

a control valve assembly connected to said circuits and shiftable between an operating circuit position in which the operating circuit communicates with a source of hydraulic pressure and an alternative tilt circuit position in which the tilt circuit communicates with said source of hydraulic pressure; and actuating mechanism operably coupled with said valve assembly for selectively and remotely controlling the shifting of the valve assembly between its alternative positions.

2. In a pull-type crop harvesting machine as claimed in claim 1, said control valve assembly including a pair of concurrently shifted valves.

3. In a pull-type crop harvesting machine as claimed in claim 2, each of said valves being coupled with an associated solenoid, said solenoids being disposed for cooperatively shifting the valves to said operating circuit position in which said valves simultaneously communicate with said operating circuit or said tilt circuit position in which said valves simultaneously communicate with said tilt circuit.

4. In a pull-type crop harvesting machine as claimed in claim 3, said actuating mechanism including a manually operated switch yieldably biased toward a de-energizing position in which said valves are in said operating circuit position.

5. In a pull-type crop harvesting machine as claimed in claim 4, said actuating mechanism further including an electric circuit for electrically coupling the switch to the solenoids.

6. In a pull-type crop harvesting machine as claimed in claim 3, said valves being yieldably biased toward said operating circuit position and shiftable by said solenoids to said tilt circuit position.

7. In a pull-type crop harvesting machine as claimed in claim 6, said actuating mechanism including a manually operated switch yieldably biased toward a de-energizing position disposing the valves in said operating circuit position, said switch being moveable to an energizing position in which the solenoids shift the valves to said tilt circuit position.

8. In a pull-type crop harvesting machine as claimed in claim 7, said actuating mechanism further including an electric circuit for electrically coupling the switch to the solenoids.

9. In a pull-type crop harvesting machine as claimed in claim 1, said tilt circuit including a pilot-operated check valve disposed to maintain the header in a selected tilt position during harvesting operations.

10. In a pull-type crop harvesting machine as claimed in claim 1, said tilt circuit including a hydraulic cylinder and fluid flow means for connecting the cylinder with the control valve assembly.

11. In a pull-type crop harvesting machine as claimed in claim 10, said tilt circuit further including a pilot-operated check valve interposed in said fluid flow means for maintaining said cylinder in a selected position during harvesting operations.

12. In a pull-type crop harvesting machine as claimed in claim 1, said control valve assembly being electrically shiftable to said alternative positions.

13. In a pull-type crop harvesting machine as claimed in claim 12, said actuating mechanism including a manually operated switch yieldably biased toward a de-energizing position in which the valve assembly is in said operating circuit position.

14. In a pull-type crop harvesting machine as claimed in claim 13, said actuating mechanism further including an electric circuit for electrically coupling the switch to the solenoids.

15. In a pull-type crop harvesting machine as claimed in claim 12, said valve assembly being yieldably biased toward said operating circuit position.

16. In a pull-type crop harvesting machine as claimed in claim 15, said actuating mechanism including a manually operated switch yieldably biased toward a de-energizing position disposing the valve assembly in said operating circuit position, said switch being moveable to an energizing position in which the valve assembly is shifted to said tilt circuit position.

17. In a pull-type crop harvesting machine as claimed in claim 16, said actuating mechanism further including an electric circuit for electrically coupling the switch to the solenoids.

18. In a pull-type crop harvesting machine as claimed in claim 1, said actuating mechanism including a manually operated switch yieldably biased toward a de-energizing position in which said valve assembly is in said operating circuit position.

19. In a pull-type crop harvesting machine as claimed in claim 1, said operating circuit being used to selectively control lateral swinging of a pull tongue between a number of angular positions relative to the frame.

20. In a pull-type crop harvesting machine as claimed in claim 19, said machine further comprising a header lift circuit for adjustably controlling raising and lowering of the header relative to the frame.

21. In a pull-type crop harvesting machine as claimed in claim 1, said valve assembly being yieldably biased toward said operating circuit position and including structure controlled by said actuating mechanism to overcome said bias.

22. An attachment for adapting a pull-type harvester for remote header tilt adjustment wherein the harvester has a frame, a harvesting header attached to the frame in a manner permitting the header to be adjustably tilted between a number of harvesting tilt positions relative to the frame, and a hydraulic operating circuit for use in controlling a certain function of the harvester, the attachment comprising:

a hydraulic tilt circuit including a hydraulic cylinder and fluid flow means for connecting the cylinder with a remote source of hydraulic pressure;

means for operably coupling the cylinder between the header and the frame for effecting said adjustable tilting;

a control valve assembly connectable with said circuits and shiftable between an operating circuit position in which the operating circuit communicates with the source of hydraulic pressure and an alternative tilt circuit position in which the tilt circuit communicates with the source of hydraulic pressure; and actuating mechanism operably connectable with said valve assembly for selectively and remotely controlling the shifting of the valve assembly between its alternative positions.

23. In an attachment as claimed in claim 22, said control valve assembly including a pair of concurrently shifted valves.

24. In an attachment as claimed in claim 23, each of said valves being coupled with an associated solenoid, said solenoids being disposed for cooperatively shifting the valves to said operating circuit position in which said valves simultaneously communicate with said operating circuit or said tilt circuit position in which said valves simultaneously communicate with said tilt circuit.

25. In an attachment as claimed in claim 24, said actuating mechanism including a manually operated switch yieldably biased toward a de-energizing position in which said valves are in said operating circuit position.

26. In an attachment as claimed in claim 25, said actuating mechanism further including an electric circuit for electrically coupling the switch to the solenoids.

27. In an attachment as claimed in claim 24, said valves being yieldably biased toward said operating circuit position and shiftable by said solenoids to said tilt circuit position.

28. In an attachment as claimed in claim 27, said actuating mechanism including a manually operated switch yieldably biased toward a de-energizing position disposing the valves in said operating circuit position, said switch being moveable to an energizing position in which the solenoids shift the valves to said tilt circuit position.

29. In an attachment as claimed in claim 28, said actuating mechanism further including an electric circuit for electrically coupling the switch to the solenoids.

30. In an attachment as claimed in claim 22, said tilt circuit further including a pilot-operated check valve interposed in said fluid flow means for maintaining said cylinder in a selected position during harvesting operations.

31. In an attachment as claimed in claim 22, said control valve assembly being electrically shiftable to said alternative positions.

32. In an attachment as claimed in claim 31, said actuating mechanism including a manually operated switch yieldably biased toward a de-energizing position in which the valve assembly is in said operating circuit position.

33. In an attachment as claimed in claim 32, said actuating mechanism further including an electric circuit for electrically coupling the switch to the solenoids.

34. In an attachment as claimed in claim 31, said valve assembly being yieldably biased toward said operating circuit position.

35. In an attachment as claimed in claim 34, said actuating mechanism including a manually operated switch yieldably biased toward a de-energizing position disposing the valve assembly in said operating circuit position, said switch being moveable to an energizing position in which the valve assembly is shifted to said tilt circuit position.

36. In an attachment as claimed in claim 35, said actuating mechanism further including an electric circuit for electrically coupling the switch to the solenoids.

37. In an attachment as claimed in claim 22, said actuating mechanism including a manually operated switch yieldably biased toward a de-energizing position in which said valve assembly is in said operating circuit position.

38. In an attachment as claimed in claim 22, said operating circuit being used to selectively control lateral swinging of a pull tongue between a number of angular positions relative to the frame.

39. In an attachment as claimed in claim 38, said machine further comprising a header lift circuit for adjustably controlling raising and lowering of the header relative to the frame.

40. In an attachment as claimed in claim 22, said valve assembly being yieldably biased toward said operating circuit position and including structure controlled by said actuating mechanism to overcome said bias.

41. In a pull-type crop harvesting machine, the improvement comprising:

a mobile frame;

a pull-tongue pivotally coupled with the frame for adjustable horizontal swinging movement about an upright axis between a number of angular positions relative to the path of travel of the machine for varying the lateral position of the machine relative to a towing vehicle;

a harvesting header attached to the frame in a manner permitting the header to be adjustably tilted between a number of harvesting tilt positions relative to the frame and raised and lowered relative to the frame between transport and harvesting positions;

a hydraulic swing circuit including a swing cylinder for controlling said swinging of the pull-tongue;

a hydraulic tilt circuit including a tilt cylinder for controlling said tilting of the header;

a hydraulic lift circuit including a lift cylinder for controlling said raising and lowering of the header;

a control valve assembly connected to said swing and tilt circuits and shiftable between a swing circuit position in which the swing circuit communicates with a source of hydraulic pressure and an alternative tilt circuit position in which the tilt circuit communicates with said source of hydraulic pressure; and electrical actuating mechanism operably coupled with said valve assembly and including a manually operated switch for selectively and remotely controlling the shifting of the valve assembly between its alternative positions.

* * * * *